United States Patent
Kumar

(10) Patent No.: US 10,423,505 B2
(45) Date of Patent: Sep. 24, 2019

(54) AGENTS TO AUTONOMOUSLY DETECT CORRUPTION OR FAILURE OF NETWORK NAMESPACES

(71) Applicant: HEWLETT PACKARD ENTERPRISE DEVELOPMENT LP, Houston, TX (US)

(72) Inventor: Vinod Kumar, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 176 days.

(21) Appl. No.: 15/787,394

(22) Filed: Oct. 18, 2017

(65) Prior Publication Data

US 2019/0114237 A1    Apr. 18, 2019

(51) Int. Cl.
| | | |
|---|---|---|
| G06F 11/07 | (2006.01) | |
| G06F 11/20 | (2006.01) | |
| H04L 12/24 | (2006.01) | |
| G06F 9/455 | (2018.01) | |
| H04L 12/26 | (2006.01) | |

(52) U.S. Cl.
CPC ...... *G06F 11/2023* (2013.01); *G06F 9/45533* (2013.01); *H04L 41/046* (2013.01); *H04L 41/0654* (2013.01); *H04L 43/0811* (2013.01); *H04L 43/0823* (2013.01); *G06F 2201/805* (2013.01)

(58) Field of Classification Search
CPC .................. G06F 11/2023; G06F 11/2028
USPC .................................................. 714/4.11, 4.4
See application file for complete search history.

(56) References Cited

U.S. PATENT DOCUMENTS

| | | | |
|---|---|---|---|
| 7,185,359 B2* | 2/2007 | Schmidt | H04L 63/0815 713/170 |
| 7,734,951 B1 | 6/2010 | Balasubramanian et al. | |
| 7,779,404 B2 | 8/2010 | Movassaghi et al. | |
| 8,195,704 B2 | 6/2012 | Kimmel et al. | |
| 8,788,455 B2 | 7/2014 | Mehta et al. | |
| 9,547,549 B2 | 1/2017 | Tipton et al. | |
| 2003/0120948 A1* | 6/2003 | Schmidt | H04L 63/0815 726/8 |
| 2016/0105392 A1* | 4/2016 | Thakkar | H04L 61/2038 709/220 |
| 2016/0105393 A1* | 4/2016 | Thakkar | H04L 41/0823 709/220 |
| 2016/0313934 A1 | 10/2016 | Isherwood et al. | |
| 2017/0039242 A1* | 2/2017 | Milton | G06Q 30/0269 |
| 2017/0161205 A1 | 6/2017 | Leggette et al. | |

OTHER PUBLICATIONS

Damian Igbe, "Identifying and Troubleshooting Neutron Namespaces," Nov. 21, 2013, pp. 1-12 [online], Retrieved from the Internet on Jun. 29, 2017 at URL: <https://www.mirantis.com/blog/identifying-and-troubleshooting-neutron-namespaces/>.

* cited by examiner

*Primary Examiner* — Chae M Ko
(74) *Attorney, Agent, or Firm* — Hewlett Packard Enterprise Patent Department

(57) ABSTRACT

Example implementations relate to network namespaces. The multiple network namespaces host a set of virtual machines, with each network namespace being defined, at least in part, by a set of rules by which the individual virtual machines are to access the set of network resources. An agent is initiated to operate autonomously to detect at least one of network namespace corruption or network namespace failure for each of the multiple network namespaces.

20 Claims, 5 Drawing Sheets

---

Implementing multiple network namespaces to host a set of virtual machines, each network namespace being defined at least in part by a set of rules by which individual virtual machines are to access the set of network resources 210

↓

Initiating an agent to operate autonomously, in detecting at least one of network namespace corruption or network namespace failure for each of the multiple network namespaces 220

AGENTS TO AUTONOMOUSLY DETECT CORRUPTION OR FAILURE OF NETWORK NAMESPACES

BACKGROUND

Network namespaces are widely used in cloud computing to host multiple virtual networks (e.g., virtual machines) over a single physical network. Each network namespace may operate over the network according to its own set of rules. Often, however, the connection between a network namespace and the network becomes corrupted or fails.

DETAILED DESCRIPTION

Figure 1A:
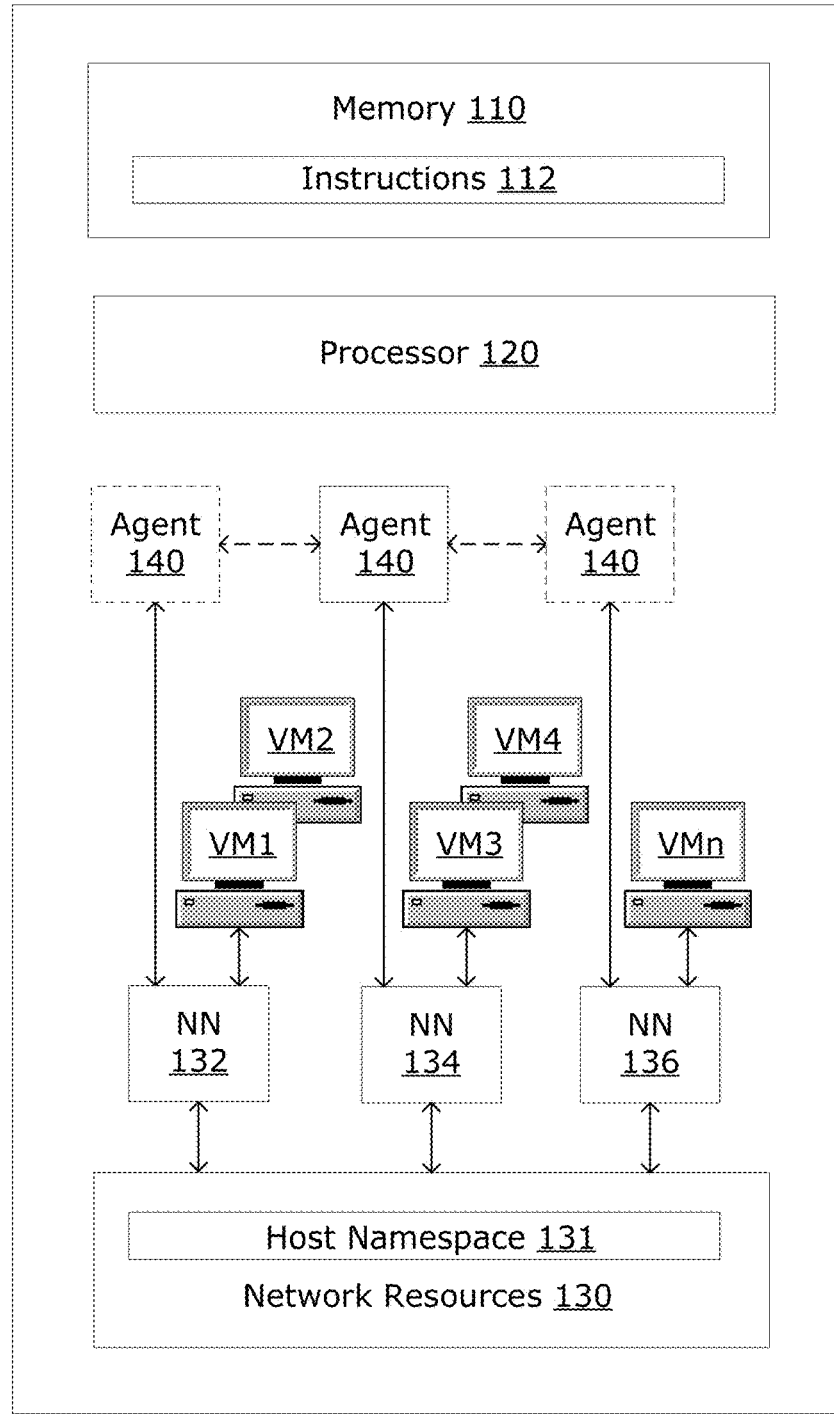
FIG. 1A illustrates an example computer system for autonomously detecting corruption or failure of a network namespace.

Network namespaces can become corrupted or suffer failure, often without detection for some period of time. As a result, the corruption or failure of the network namespace can have a disproportionate impact to virtual machines and systems which utilize the network namespace.

An example computer system is provided to initiate an agent that operates autonomously in detecting corruption or failure of network namespaces. In particular, an example computer system includes a set of network resources, a memory to store a set of instructions, and a processor to execute the instructions. As described with various examples, the processor executes the instructions to cause the computer system to implement multiple network namespaces to host a set of virtual machines. Each network namespace is defined, at least in part, by a set of rules by which the individual virtual machines are to access the set of network resources. Further, the processor executes the instructions to cause the computer system to initiate an agent to operate autonomously in detecting at least one of network namespace corruption or network namespace failure for each of the multiple network namespaces.

Some examples described herein can generally involve the use of computing devices, including processing and memory resources. For example, one or more examples described herein may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Examples of a processor may include a microcontroller, a microprocessor, central processing unit core(s), an application-specific integrated circuit (ASIC), a field programmable gate array (FPGA), and/or other hardware device suitable for retrieval and/or execution of instructions from computer-readable medium to perform functions related to various examples. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1A illustrates an example computer system to autonomously detect corruption or failure of a network namespace on a host computer system. In particular, a host computer system 100 may be implemented to provide cloud computing infrastructure services (e.g., infrastructure-as-a-service), such as data portioning, scaling, etc. By way of example, the host computer system 100, as shown in FIG. 1A, may perform several "compute" functions in a network computing environment, such as managing and hosting multiple virtual machines that share the network resources 130 of the host computer system. In addition, single physical networks may include single-tenancy servers (e.g., bare-metal servers) or multi-tenancy servers.

With further reference to FIG. 1A, the host computer system 100 includes a memory 110, a processor 120, and a set of network resources 130. The memory 110 can include, for example, a memory component (e.g., DRAM memory component) that stores a set of instructions for use by the host computer system 100. The processor 120 operates to execute the instructions stored on the memory 110. The set of network resources 130 may include, for example, components that link the host computer system 100 to an external network (e.g., set of network interfaces, routing tables, host namespace, etc.). The host computer system 100 may be enabled for virtualizing, enabling multiple virtual machines to utilize partitioned logical instances of the set of network resources 130. Accordingly, the set of network resources 130 may include components to create and run virtual machines (e.g., hypervisor). In other variations, the components to create and run virtual machines are separate from the components that link the host computer system 100 to an external network.

In the example of FIG. 1A, the processor 120 executes the instructions stored on the memory 110 to implement multiple network namespaces over a given duration of time. A network namespace may correspond to a logical instance of an underlying host namespace 131 from which the host computer system 100 can connect to and utilize an external network computing environment. In an example of FIG. 1, the host computer system 100 is shown to include network namespaces 132, 134 and 136 that are logical instances of the host namespace 131. While the multiple network namespaces 132, 134 and 136 are logical instances of the host namespace 131, each of the multiple network namespaces 132, 134 and 136 can be implemented with a separate set of policies, rules and resources (e.g., routing tables).

In an example of FIG. 1A, each network namespace 132, 134, 136 is defined by its own policies, routing tables and other network resources. In this way, each network namespace controls the use of the host namespace 131 by logical entities (e.g., virtual machines) that run on each network namespace 132, 134, 136. In FIG. 1A, network namespace 132 hosts virtual machine 1 ("VM1") and virtual machine 2 ("VM2"), and network namespace 134 hosts VM3 and VM4. The network namespace 132 can implement a policy to restrict use of virtual machines to specific external network resources (e.g., specific websites), while network namespace 134 may implement policies that allow for such access. Thus, the network namespaces 132, 134 may be independent and implemented using alternative sets of policies, even though both network namespace 132 and network namespace 134 share the same host namespace 131.

Network namespaces suffer various forms of corruption and failure in their operation. When a network namespace becomes corrupted, the namespace may not implement policies as intended, leading to potential performance or security problems. Likewise, when a network namespace fails, the problem may not be externally detectable immediately. Moreover, when such problems occur, the problems with the namespace tend to accumulate and cascade over time. In this context, host computer system 100 implements an agent 140 that can be initiated to traverse each of the multiple namespaces to detect problems (e.g., corruption, failure), and to perform a remedial action (e.g., provide notification alert) when the problem is detected. In some examples, the agent 140 can implement remedial operations to "heal" the network namespace 132, 134, 136 when such problems are encountered. For example, the agent 140 may perform a remedial action or implement remedial operations on network namespace 132, and subsequently perform a remedial action or implement remedial operations on network namespace 134. Alternatively, the agent 140 may perform remedial actions or implement remedial operations simultaneously on multiple network namespaces (e.g., network namespace 132 and network namespace 134).

As an example, certain events, such as debugging the cloud environment for example, may lead to corruption or failure of network namespaces (e.g., deletion of patch ports, missing security rules, missing routing table entries, etc.), which may result in connectivity failure and/or security threats to the virtual machines. If one of the network namespaces 132, 134, 136 becomes corrupted, then the virtual machines that utilize the network namespace may no longer have restrictions on the external network resources that those machines can access. This can lead to vulnerability issues for the virtual machines. In contrast to conventional approaches, which tolerate the occurrence of corruption or failure within network namespaces for a duration of time (which may cause prolonged exposure, performance issues and cascading problems with the host computer system 100), examples provide for the host computer system 100 to implement an agent 140 to autonomously detect corruption or failure issues of network namespaces on the host computer system 100.

The processor 120 may execute instructions 112 stored on the memory 110 to initiate the agent 140. In this way, the agent 140 can autonomously operate on the host computer system 100 to detect namespace issues, including issues where a network namespace may cease to exist (e.g., connectivity of network namespace) as well as other network namespace issues, such as namespace corruption. The agent 140 may be initiated to utilize network namespace resources, such as policies and routing tables used to define each of the respective network namespaces 132, 134, 136.

Additionally, in some variations, the agent 140 may be used to repair the network namespaces that are detected as having failed, or which have otherwise become corrupted. The autonomous detection, and in some examples autonomous repair, of a failed or corrupted network namespace reduces the amount of downtime and security threats, as well as other benefits, for the virtual machines associated with the corrupted or failed network namespaces.

Figure 1B:
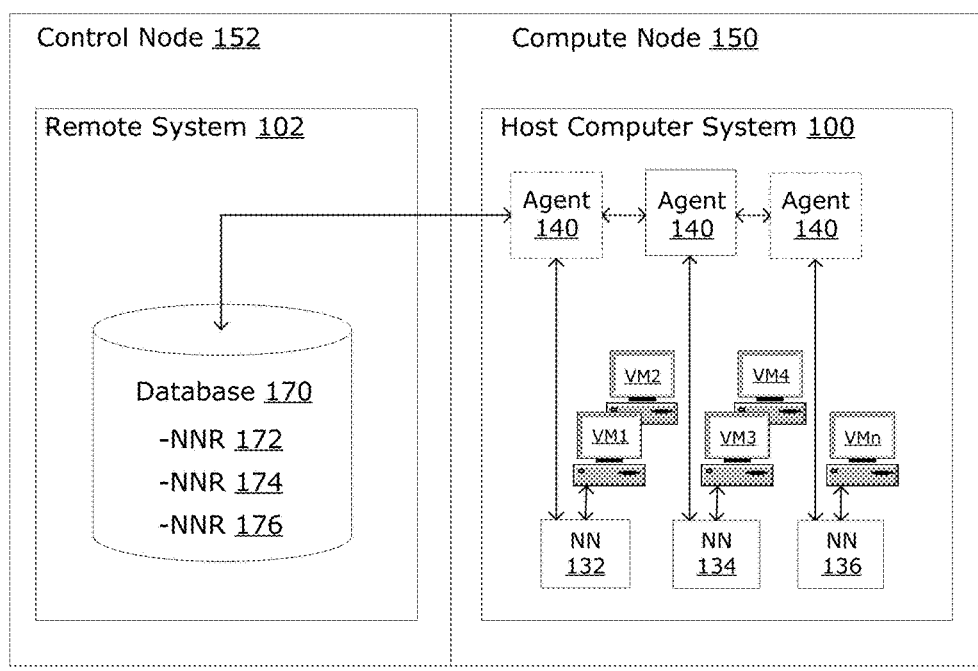
FIG. 1B illustrates a representation of the example computer system of FIG. 1A including a control node.

FIG. 1B illustrates an example computer system that utilizes a compute node and a control node to implement an agent for detecting and rectifying network namespace problems. In an example shown, a compute node 150 can be implemented by, for example, host computer system 100 to provide a virtualized environment using multiple network namespaces 132, 134, 136, as described with an example of FIG. 1A. The control node 152 may be implemented by a remote system 102. The host computer system 100 and the remote system 102 may each implement their own respective physical namespaces (e.g., host namespace 131). While an example of FIG. 1B illustrates the compute and control nodes 150, 152 on separate computer systems, in variations, the compute and control nodes 150, 152 can reside on a common machine or system. Still further, in other variations, the compute and/or control nodes 150, 152 may each operate on multiple machines.

In operation, the control node 152 stores and provides the compute node 150 with network namespace resources, including instructions and data from which the network namespaces 132, 134, 136 can be defined and implemented on the host computer system 100. According to some examples, the control node 152 includes a database 170 which stores policies, routing tables and accompanying instructions (collectively namespace resources 172, 174, 176) for the compute node 150 on which corresponding network namespaces are to be implemented. The compute node 150 may initiate namespaces 132, 134, 136, which include processes that access the control node 152 to retrieve policies and routing tables for implementing the respective network namespace. As described in greater detail, with initiation of individual namespaces 132, 134, 136, the agent 140 is also initiated to monitor and/or repair namespaces over a given duration. The agent 140 may retrieve the network namespace resources 172, 174, 176 in order to monitor and/or repair namespaces 132, 134, 136 of the compute node 150 over a given duration of time.

According to some examples, the control node 152 provides the agent 140 with a list of network namespaces configured on the host computing system 100. The agent 140 requests, from the control node 152, the network namespace resources (e.g., 172, 174, 176) corresponding to the network namespaces (e.g., 132, 134, 136) included in the list. The control node 152 reads the database 170 for the network namespace resources for the network namespace(s) in the request. For example, the control node 152 reads the database 170 for network namespace resources 172, which corresponds to the network namespace resources utilized by network namespace 132. The control node 152 serves the request and provides the network namespace resources 172 to the agent 140 for determining whether the set of network namespace resources 172 from the database 170 matches the set of network namespace resources presently operating on network namespace 132.

In an example, a determination of the agent 140 is for namespace existence. Upon initiation, the agent 140 receives, from the control node 152, a list of the network namespaces stored on the database 170. The agent 140 compares the list of network namespaces stored on the database 170 to the network namespaces presently operating on the host computer system 100. Network namespaces included on the list but not presently operating on the host computer system 100 are determined to be non-existent (in other words, determined to suffer a connectivity failure with respect to a host namespace). For example, if the list of network namespaces stored in the database 170 included network namespaces 132, 134 and 136, but only network namespaces 132 and 134 were presently operating on the host computer system 100, then the agent 140 may determine that network namespace 136 is non-existent.

In an example, the agent 140 determines whether an existing namespace is corrupted through a matching process. For example, the agent 140 may determine whether the network namespace resources (e.g., policies, routing tables, etc.) provided by the control node 152 match the network namespace resources being implemented on the host computer system 100. If an existing namespace 132, 134, 136 does not match, then the agent 140 may flag the unmatched network namespace to be an occurrence of network namespace corruption. For example, referring to FIG. 1B, if the agent 140 determines that a policy stored on the network namespace resource 172 for restricting VM1 to specific external network resources (e.g., specific website) is not present in the policies being implemented on network namespace 132 on the host computer system 100, then the agent 140 may determine that network namespace 132 has been corrupted.

In addition to autonomously detecting at least one of a network namespace corruption or failure, the processor 120 can execute instructions to cause the host computer system 100 to configure the agent 140 to autonomously repair the corrupted or failed namespace. In some examples, the agent 140 may autonomously repair a corrupted or a failed file (e.g., configuration file to implement firewall rules) by creating a new instance of the corrupted or the failed file utilizing the network namespace resources served from the control node 152 in response to the request from the agent 140. For example, if the agent 140 autonomously detects a connectivity failure (e.g., non-existent namespace) for network namespace 132, the agent 140 may utilize the network namespace resources 172 for network namespace 132 served to the agent 140 by the control node 152 and create an instance of the network namespace resources 172 for network namespace 132 to create a new network namespace. In addition, if the agent 140 autonomously detects missing security rules (e.g., namespace corruption) for network namespace 132, the agent 140 may utilize the network namespace resources 172 for network namespace 132 served to the agent 140 by the control node 152 and create an instance of the network namespace resources 172 for network namespace 132 to either replace the corrupted portion of the namespace or create a new network namespace.

Figure 1C:
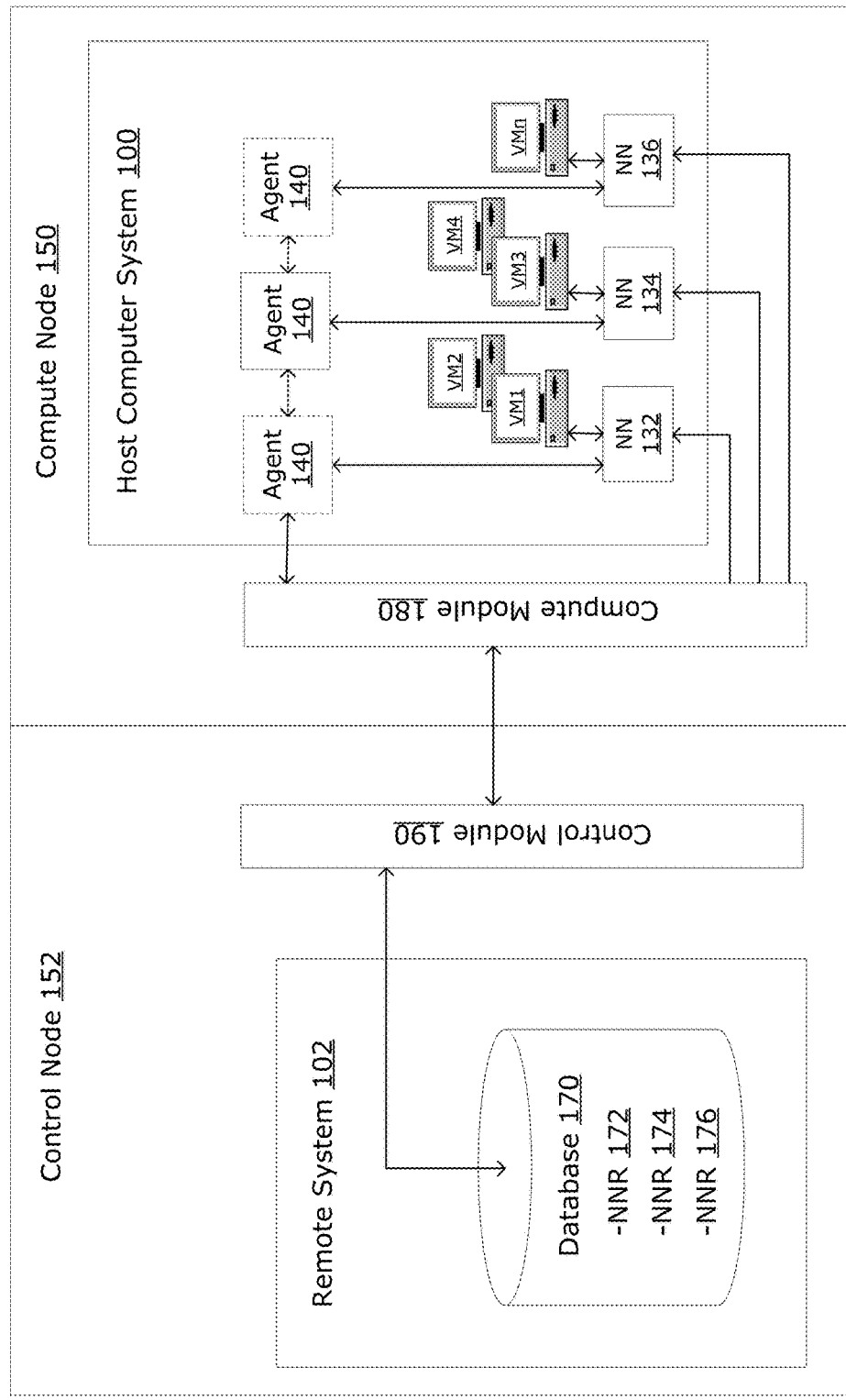
FIG. 1C illustrates a representation of the example computer system of FIG. 1A including a compute module and a control module.

FIG. 1C illustrates an example computer system that utilizes a compute module and a control module to create network namespaces and implement an agent for detecting and rectifying network namespace problems. The compute module and the control module may be implemented by hardware (e.g., a processor, a microcontroller, electronic circuitry, an ASIC, an FPGA, etc.) or a combination of hardware and programming (e.g., processor-executable instructions stored on a non-transitory machine readable medium). In an example shown, a compute module 180 can be implemented by, for example, the compute node 150. In addition, a control module 190 can be implemented by, for example, the control node 152. Both the compute module 180 and the control module 190 facilitate the creation and detection/repair of network namespaces implemented on the host computer system 100.

In an example, for the creation of network namespaces 132, 134 and 136, the compute module 180 receives a notification from the control module 190 upon entry of the network namespace resources 172, 174 and 176 into the database 170 by a user (e.g., administrator). The compute module 180 creates (e.g., makes an API call or executes commands) network namespaces 132, 134 and 136. The compute module 180 subsequently queries the control module 190 for additional details (e.g., network namespace resources) for each of the newly created namespaces 132, 134 and 136. The control module 190 provides the network namespace resources to the compute module 180, and the compute module 180 configures each of the network namespaces (e.g., 132, 134, 136) with their respective network namespace resources (e.g., 172, 174, 176).

Upon initiation of the agent 140 to detect/rectify corruption or failure of the network namespaces implemented on the host computer system 100, the compute module 180 passes a list of network namespaces to the agent 140 to do a check after a predetermined period of time. After expiry of the predetermined period of time, the agent 140, through the compute module 180, queries the control module 190 for network namespace resources. The control module 190 reads the database 170 for the network namespace resources (e.g., 172, 174, 176) and sends the network namespace resources to the agent 140 by way of the compute module 180. The agent 140 then detects/repairs the network namespace corruption or failure according to the examples provided in FIGS. 1A and 1B.

The processor 120 may also execute the instructions to cause the host computer system 100 to configure the agent 140 to operate independently with each of the multiple network namespaces. In reference to FIG. 1A, the agent 140 may autonomously detect and/or repair a corruption or failure of network namespace 132 and may then operate independently to autonomously detect and/or repair a corruption or failure of network namespace 134.

In other variations, the agent 140 may autonomously detect a corruption or failure of network namespace 132 and then operate independently to autonomously detect a corruption or failure of network namespace 134 before the host computer system 100 configures the agent 140 to autonomously repair the detected namespace corruption or failure. In other variations still, the host computer system 100 may include multiple instances of the agent 140 so the multiple instances of the agent 140 may simultaneously operate to autonomously detect and/or repair the multiple network namespaces.

According to some examples, the processor 120 executes the instructions to configure the agent 140 to initiate automatically at pre-determined time intervals. For example, the agent 140 may be initiated for a periodic check (e.g., every 5 seconds) of each of the multiple network namespaces in order to autonomously detect and/or repair a corrupted or failed network namespace being implemented in the host computer system 100. In other examples, the host computer system 100 may be configured to enable manual initiation (e.g., "on-demand" initiation by an administrator) of the agent 140 to autonomously detect and/or repair the multiple network namespaces of the host computer system 100. In other examples still, the processor 120 may execute the instructions to cause the agent 140 to self-terminate after repairing a detected failure or corruption.

Figure 2A:
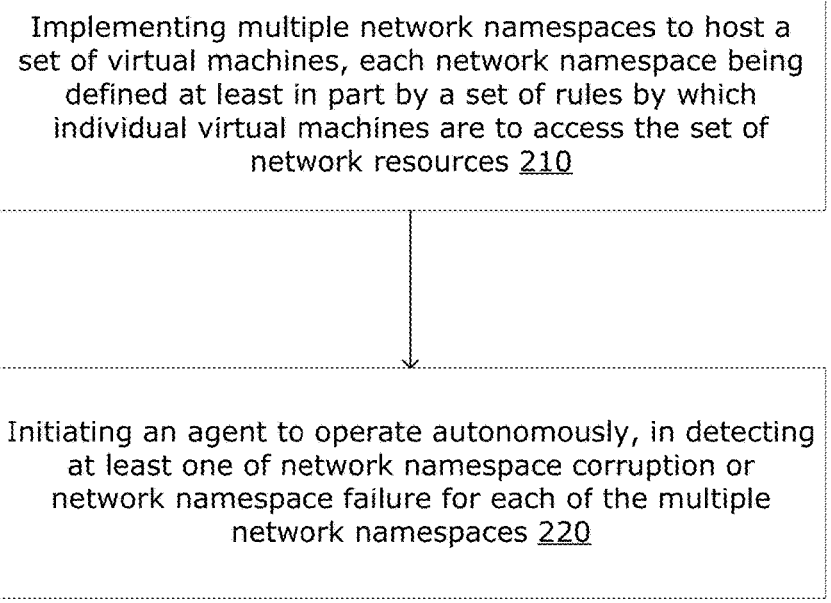
FIG. 2A illustrates an example method for autonomously detecting corruption or failure of a network namespace.
Figure 2B:
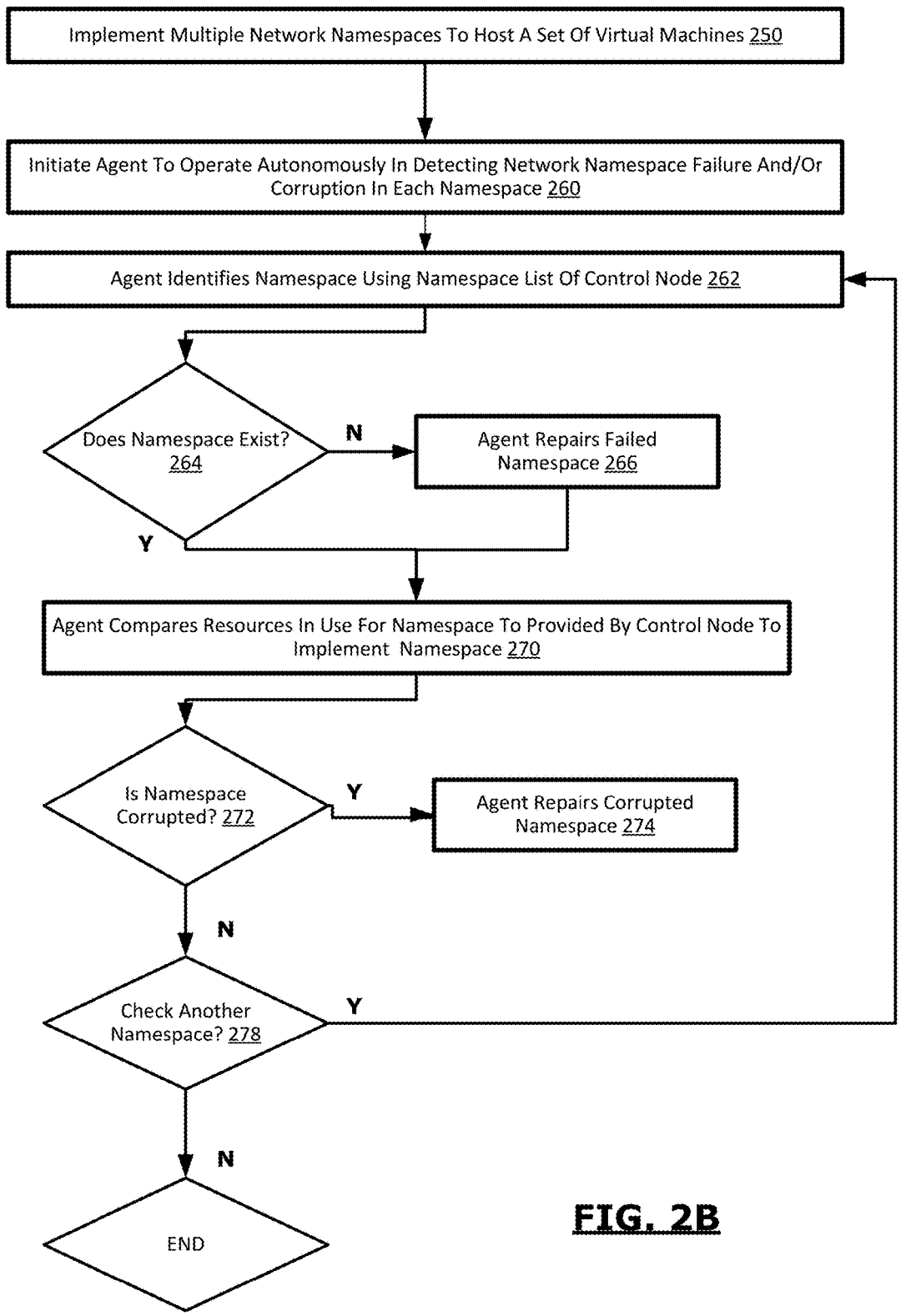
FIG. 2B illustrates an example method to implement an autonomous agent to detect and repair failed and/or corrupted network namespaces.

FIG. 2A and FIG. 2B illustrate example methods to autonomously detect and repair failure and/or corruption of a network namespace in connection with hosting virtual machines utilizing the respective network namespaces. Example methods such as described by examples of FIG. 2A and 2B can be implemented using example computer systems, such as described with the example of FIGS. 1A, 1B and 1C. Accordingly, reference is made to elements described with examples of FIG. 1A through FIG. 1C to illustrate suitable components for implementing a step or sub-step being described.

With reference to an example of FIG. 2A, multiple network namespaces may be implemented in connection with hosting a set of virtual machines (210) on a host computer system. Each network namespace can be defined by a set of rules (e.g., policies) and other resources (e.g., routing tables). By way of example, the virtual machines can utilize respective network namespaces 132, 134, 136 to access a network environment using the host computer system 100.

As described with the examples of FIGS. 1A, 1B and 1C, an agent may be initiated on the host computer system to operate autonomously, in detecting at least one of network namespace corruption or network namespace failure for each of the multiple network namespaces (220). In some examples, the agent 140 can be initiated on the host computer system 100 to traverse individual network namespaces 132, 134, 136 to check for failure and/or corruption of the respective network namespaces 132, 134, 136

With reference to an example of FIG. 2B, multiple network namespaces are implemented on a host computer system that hosts virtual machines (250). The host computer system 100 can, for example, use policies, routing tables and other resources provided from the control node 152 to implement each network namespace 132, 134, 136.

The host computer system may initiate an agent to autonomously detect failure and/or corruption in a network namespace that is used by a hosted virtual machine (260). The agent 140 may, for example, be initiated automatically, once the respective network namespaces are implemented. As an alternative or variation, the host computer system 100 can initiate the agent 140 based on timing events (e.g., predetermined timing intervals) or in response to other events (e.g., initiation from manual input).

In some examples, once the agent is initiated, the agent identifies individual network namespaces which are identified as existing by the control node (262). For each network namespace, the agent makes a determination as to whether the network namespace exists (264). If the namespace does not exist, the agent 140 repairs the failed network namespace by querying the control node 152 for the network namespace resources of the failed network namespace, and creating an instance of the network namespace resources to restore the failed network namespace (266).

If the network namespace is deemed to exist, or otherwise connected again, the agent may make another determination as to whether the network namespace is corrupted. In some examples, the agent may compare the policies, routing tables and/or other resources in use for the network namespace on the host computer system to resources provided by the control node 152 (270). Based on the comparison, the agent makes a determination as to whether the network namespace is corrupted (272). If the network namespace is determined to be corrupted ("YES" at block 272), the agent repairs the corrupted namespace (274).

If the determination is that the network namespace is not corrupted ("NO" at block 272), or that the corrupted namespace has been repaired, the agent may check to determine whether another network namespace is to be checked (278). For example, the agent 140 may check a list of the control node 152 to determine if any network namespace that was to be implemented by the host computer system 100 remains unchecked. If another network namespace is to be checked ("YES" at block 278), an example method can repeat the method from (262). Otherwise, the method can end.

FIG. 2B illustrates an example for use in implementing an agent operating autonomously to detect and repair failure and corruption with respect to each network namespace that is to be implemented on the host computer system. In variations, other examples may vary the sequence of detection (e.g., detect corruption, then failure), or otherwise vary from the manner in which the agent is described to traverse individual network namespaces. The agent may, for example, selectively check some or all of the network namespaces. Alternatively, multiple instances or versions of the agent may be used to check multiple network namespaces concurrently.

As described by examples of FIGS. 1A, 1B and 1C, as well as FIG. 2A and FIG. 2B, the host computer system 100 can implement autonomous agents to detect, and in some cases repair, failed and/or corrupted network namespaces. Through autonomous detection, such network namespace problems can be detected early on, before such problems propagate and expand to affect other resources and network namespaces. In this way, examples such as described reduce, for example, the amount of downtime that results from a failed or corrupted network namespace when implemented in a virtual environment. As such, examples also limit exposure, for example, of virtual machines and network namespaces to security threats, such as would otherwise result when policies are not properly implemented on a virtual machine.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A computer system comprising:
a set of network resources;
a memory to store a set of instructions; and
a processor to execute the instructions to cause the computer system to:
implement multiple network namespaces to host a set of virtual machines, each network namespace being defined at least in part by a set of rules by which individual virtual machines are to access the set of network resources; and initiate an agent to operate autonomously in detecting at least one of network namespace corruption or network namespace failure for each of the multiple network namespaces.

2. The computer system of claim 1, wherein the agent operates to detect at least one of network namespace corruption or network namespace failure by accessing a remote control node on which a set of network namespace resources are stored for implementing the multiple network namespaces.

3. The computer system of claim 1, wherein the processor executes the instructions to cause the computer system to configure the agent to operate independently with each of the multiple network namespaces.

4. The computer system of claim 1, wherein the processor executes the instructions to cause the computer system to configure the agent to autonomously repair at least a first network namespace that is detected as having at least one of network namespace corruption or network namespace failure.

5. The computer system of claim 4, wherein the network namespace corruption or network namespace failure of the first network namespace corresponds to a network connectivity failure of the first network namespace with respect to a host namespace of the computer system.

6. The computer system of claim 4, wherein the processor executes the instructions to cause the computer system to create a new instance of a network namespace that is detected as being corrupted or failed.

7. The computer system of claim 1, wherein the processor executes the instructions to cause the agent to initiate automatically at pre-determined time intervals.

8. The computer system of claim 1, wherein the processor executes the instructions to cause the agent to self-terminate after repairing a detected failure or corruption.

9. A method for autonomously detecting corruption or failure of a network namespace, the method comprising:

implementing, by a processor of a computer system, multiple network namespaces to host a set of virtual machines, each network namespace being defined at least in part by a set of network namespace resources; and initiating, by a processor of a computer system, an agent to operate autonomously in detecting at least one of network namespace corruption or network namespace failure for each of the multiple network namespaces.

10. The method of claim 9, wherein the agent operates to detect at least one of network namespace corruption or network namespace failure by accessing a remote control node on which a set of network namespace resources are stored for implementing the multiple network namespaces.

11. The method of claim 9, wherein the agent operates independently with each of the multiple network namespaces.

12. The method of claim 9, wherein the agent autonomously repairs at least a first network namespace that is detected as having at least one of the network namespace corruption or network namespace failure.

13. The method of claim 12, wherein the network namespace corruption or network namespace failure of the first network namespace corresponds to a network connectivity failure of the first network namespace with respect to a host namespace of the computer system.

14. The method of claim 12, wherein the agent autonomously repairs at least the first network namespace by instructing the computer system to create a new instance of a network namespace that is detected as being corrupted or failed.

15. A non-transitory computer-readable medium to store instructions that, when executed by a processor of a computer system, cause the computer system to:

implement multiple network namespaces to host a set of virtual machines, each network namespace being defined at least in part by a set of rules by which individual virtual machines are to access a set of network resources; and initiate an agent to operate autonomously to:
(i) determine, from the multiple network namespaces, a failed network namespace, and, for each of the failed network namespaces, create a new instance of the network namespace; and
(ii) determine, from the multiple network namespaces, a corrupted network namespace, and, for each corrupted network namespace, reconfigure the network namespace.

16. The non-transitory computer readable medium of claim 15, wherein the agent operates autonomously to determine at least one of network namespace corruption or network namespace failure by accessing a remote control node on which a set of network namespace resources are stored for implementing the multiple network namespaces.

17. The non-transitory computer readable medium of claim 15, wherein the processor executes the instructions to cause the computer system to configure the agent to operate independently with each of the multiple network namespaces.

18. The non-transitory computer readable medium of claim 15, wherein the processor executes the instructions to cause the computer system to configure the agent to autonomously repair at least a first network namespace that is detected as having at least one of the network namespace corruption or network namespace failure.

19. The non-transitory computer readable medium of claim 18, wherein the network namespace corruption or network namespace failure of the first network namespace corresponds to a network connectivity failure of the first network namespace with respect to a host namespace of the computer system.

20. The non-transitory computer readable medium of claim 18, wherein the processor executes the instructions to cause the agent to self-terminate after repairing a detected failure or corruption.

* * * * *